United States Patent [19]

Hay

[11] Patent Number: 4,971,234
[45] Date of Patent: Nov. 20, 1990

[54] PIVOTABLE STORAGE UNIT FOR VEHICLES

[76] Inventor: Peter B. Hay, 2700 Walnut St., Bellingham, Wash. 98225

[21] Appl. No.: 464,336

[22] Filed: Jan. 12, 1990

[51] Int. Cl.$^5$ .............................................. B60R 11/06
[52] U.S. Cl. ............................ 224/42.32; 224/42.33; 296/37.6; 248/145; 211/131; 414/522
[58] Field of Search .............. 224/42.32, 42.33, 42.34, 224/42.42, 42.43, 42.44, 282, 42.03 A, 42.08; 296/37.5, 37.6; 248/122, 124, 131, 32, 145; 211/129, 131, 166; 312/248; 414/522

[56] References Cited

U.S. PATENT DOCUMENTS

| | | | |
|---|---|---|---|
| 2,195,366 | 3/1940 | Haigh | 211/131 X |
| 2,553,507 | 5/1951 | Rosenberg | 211/131 |
| 2,692,689 | 10/1954 | Wynne, Sr. | 248/124 X |
| 2,883,066 | 4/1959 | Pratt | 248/122 X |
| 3,151,595 | 10/1964 | Stainbrook | 248/124 X |
| 3,164,259 | 1/1965 | De'Caccia | 211/131 |
| 3,826,529 | 7/1974 | Wood | 296/37.6 |
| 4,085,961 | 4/1978 | Brown | 296/37.6 |
| 4,375,306 | 3/1983 | Linder | 414/522 X |
| 4,469,364 | 9/1984 | Rafi-Zadeh | 296/37.6 |
| 4,518,189 | 5/1985 | Belt | 296/22 |
| 4,573,731 | 3/1986 | Knaack et al. | 224/42.42 X |
| 4,733,898 | 3/1988 | Williams | 224/42.42 X |
| 4,789,195 | 12/1988 | Fletcher | 296/37.6 |
| 4,844,305 | 7/1989 | McKneely | 224/42.42 |

FOREIGN PATENT DOCUMENTS

| | | | |
|---|---|---|---|
| 132363 | 3/1933 | Fed. Rep. of Germany | 248/124 |
| 356349 | 9/1961 | Switzerland | 211/131 |
| 491385 | 9/1938 | United Kingdom | 248/122 |
| 589890 | 7/1947 | United Kingdom | 211/129 |
| 723284 | 2/1955 | United Kingdom | 211/131 |

Primary Examiner—Henry J. Recla
Assistant Examiner—Robert M. Fetsuga
Attorney, Agent, or Firm—Hughes & Multer

[57] ABSTRACT

A storage unit for mounting in the box of a pickup truck. The storage unit has a base which is anchorable to the bed of the pickup truck box. A substantially vertical support stanchion is mounted to the base. Storage shelves are pivotably mounted to the support stanchion so that each storage shelf is pivotable about the stanchion independently of the others. Mechanisms are provided for locking each storage shelf in first and second selected angular positions about the support stanchion. In the first selected angular position, the storage tray is located within the pickup box. In the second selected angular position, the storage tray extends outwardly through the tailgate opening at the rear of the pickup box.

16 Claims, 5 Drawing Sheets

PIVOTABLE STORAGE UNIT FOR VEHICLES

BACKGROUND OF THE INVENTION

1. Field of the Invention

The present invention relates to storage units in general, and, more particularly, to a storage unit for installation in a vehicle, such as a pickup truck or the like.

2Background Art

It is frequently necessary or convenient for carpenters, plumbers, mechanics, appliance servicemen, and the like, to perform service calls or other work in the field. Some of these workmen generally have a need to carry significant numbers of tools and supplies to the work site. Accordingly, some of these workmen generally use a pickup or similar truck fitted with tool-carrying compartments in the cargo area or sidewalls thereof. Such trucks, however, are expensive, and frequently such compartments, if installed in the bed of the pickup, may interfere with the use of the remainder of the pickup box for the carrying of cargo. Still further, some such storaqe compartments require the workman to reach or climb into the pickup truck box to retrieve the stored tools or materials, and it may be physically strenuous or harmful, let alone inconvenient, for the workman to bend over and reach into the pickup truck box to lift such heavy items. Another deficiency which is encountered with some forms of conventional tool boxes is that they interfere with the fitting of a conventional cover, such as a canopy, to a pickup box; such conventional covers are highly desirable, inasmuch as they serve to protect the contents of the pickup box from exposure to the elements and theft.

Despite the deficiencies encountered with conventional pickup tool boxes, proper storage of tools and materials in the truck is frequently critical to the efficiency of the workman; if not properly retained, the tools and materials (particularly small materials, such as nails and bolts) may quickly become scattered about the pickup box so as to interfere With the efficient rendering of services by the Workman. Accordingly, a number of designs of storage and tool boxes for installation in vehicles, such as pickup trucks, have been proposed in the past.

One such tool box is that disclosed in U.S. Pat. No. 4,789,195, issued Dec. 6, 1988 to Fletcher. Fletcher discloses a storage box for tools and the like, which includes a long upper box which sets on, and extends over, the upper edge of the sidewall of the pickup box. Drawers and compartments ar mounted beneath the upper box, above and at the forward and rearward ends of the fender well. As noted above, tool boxes of the type disclosed by Fletcher interfere with the installation of a conventional canopy to protect the contents of the pickup box. Also, in order to retrieve tools or materials which are stored in the compartment of the tool box of Fletcher which is located between the front end of the fender well and the forward wall of the pickup box, it would be necessary for the workman to climb into the pickup box, and then bend over or kneel in the pickup box to retrieve the materials. Still further, in the event that the workman should desire to use the full capacity of the pickup box for conventional cargo carrying, it would appear to be a relatively difficult and time-consuming task to remove the tool box of Fletcher from the pickup.

Another vehicle storage unit is disclosed in U.S. Pat. No. 4,573,731, issued Mar. 4, 1986 to Knaack et al. Knaack et al. disclose a storage drawer structure secured to the bed of a pickup truck. The storage drawer is enclosed within a boxlike housing, the top of which serves as a raised floor on the pickup truck bed. The drawer, which pulls out through the rear opening of the pickup box, is formed with a plurality of U-shaped internal channels in which divider plates are mounted. Structures are included in the unit to provide high strength and rigidity, and the unit is bolted to the vehicle floor. Accordingly, while the storage drawer unit of Knaack et al. appears to be a relatively strong design, it also appears to be a unit which would be quite difficult for the workman to remove from the bed of a pickup so that he would be able to use its full carrying capacity. Furthermore, while the top of the storage unit serves as a raised floor for the pickup box, the increase in height of the floor would likely render it more difficult to load and unload heavy objects from the bed of the pickup. Still further, the maximum size of tools and materials which could be stored in such a unit would be restricted to the internal height of the boxlike structure; this deficiency could prove particularly significant when attempting to store large power tools, such as power drills and saws, as well as materials contained in large boxes.

U.S. Pat. No. 4,469,364, issued Sept. 4, 1984, to Rafi-Zadeh, discloses a tool box mounted in a pickup truck bed with a moveable cover arranged over the bed. Storage units are provided which may be either upwardly directed bins or storage compartments, or drawers slideable relative to an associated frame. In general, the tool box of Rafi-Zadeh exhibits similar deficiencies in access and removability to those which have been described above.

U.S. Pat. No. 4,085,961, issued Apr. 25, 1978, to Brown, shows a tool box mount for a pickup truck. A frame is provided which supports a tool box, and which swings between a first position where the tool box can be opened, and a second position where the tool box cannot be opened. In the position in which the tool box cannot be opened, the front of the tool box faces parallel to and against a side of the pickup truck box. To move the tool box to the position in which it can be opened, the frame is swung away from the side of the pickup truck box on a pivoting arm. The frame is pivotably mounted on the end of the arm, so that as the arm swings the frame away from the side of the pickup truck box, the frame itself can be counterrotated on the arm so as to achieve a final position in which the front of the tool box faces the open end of the pickup box, when the tailgate is down. When the tailgate is closed, the frame cannot be swung to the position in which the tool box can be opened since it is necessary to swing the frame out over the open tailgate in order to achieve the second position. The principal objective of the device disclosed by Brown appears to be prevention of theft of the tools in the tool box. While it may be effective in that regard, the device disclosed by Brown shares a number of the deficiencies of the conventional tool box designs discussed above, for example, the workman must still lean over the tailgate of the pickup to retrieve tools from within the tool box. Also, when the tool box is in the position in which it can be opened, the workman has access to only one side of the tool box (i.e., the front of the tool box); accordingly, the device disclosed by Brown would appear to be limited to use only with conventional front-opening tool boxes which have relatively limited storage capacity. Furthermore, the frame taught by Brown appears to be suitable for mounting of only a single such tool box, thus further limiting the tool-carrying capacity. Still further, the frame assembly disclosed by Brown is a relatively complex device, and would consequently appear to be relatively expensive and difficult to manufacture.

Accordingly, there exists a need for a convenient, effective, and relatively inexpensive vehicle storage unit which avoids the deficiencies described above. Such a desirable vehicle storage unit would not interfere with the installation of a conventional pickup truck canopy, and would be easy to remove and replace in the event that the workman desires to use the full capacity of the pickup box for conventional cargo carrying. Such a desirable storage unit would preferable have the ability to position the tools and materials stored therein in a first location which is within the box of the pickup truck when the tailgate is closed, and a second position which extends through the opening provided when the tailgate is lowered, so that the workman does not need to lean or climb into the pickup box to retrieve the tools or materials. Still further, such a storage unit would preferably provide access to storage areas on more than one face thereof, so as to maximize efficient storage and ease of access.

SUMMARY OF THE INVENTION

The present invention, in its broadest sense, comprises a storage unit for mounting in the box of a pickup truck. A base is provided which is anchorable to the pickup truck bed. A substantially vertical support stanchion is mounted to the base. A storage shelf is pivotably mounted to the support stanchion, and means are provided for locking the storage shelf in a first and a second selected angular positions about the support stanchion. A second storage shelf may be pivotally mounted to the support shelf so that the second storage shelf and the first storage shelf are pivotable about the support stanchion independently of one another. Means may also be provided for locking the second storage shelf in the first and second selected angular positions about the support stanchion.

The support stanchion may have a substantially cylindrical exterior, and each storage shelf may comprise a substantially cylindrical sleeve mounted around the support stanchion and a substantially horizontal storage tray mounted to the sleeve so that the geometric center of the storage tray is offset from the vertical axis of the sleeve. The storage trays may each be substantially rectangular in horizontal cross-section, and have the cylindrical sleeve mounted to a corner thereof. The first selected angular position may be such that the storage tray is located within the pickup box so that the tailgate may be closed, and the second selected angular position may be such that the tray extends outwardly through the lateral rear opening of the pickup boX, when the tailgate is down.

In one embodiment, the storage unit may comprise a base supporting plate anchorable to the pickup bed. A tubular support stanchion is provided, wherein the support stanchion has first and second radial holes in the exterior surface thereof, the first and second holes being both at substantially the same axial distance along the stanchion and being spaced apart from one another by a selected angular distance. Means are provided for mounting the support stanchion to the base supporting plate in substantially vertical orientation to the pickup bed. The means for mounting the stanchion to the base supporting plate in substantially vertical orientation may be a substantially cylindrical lug perpendicularly mounted to the base supporting plate for being received within the lower end of the tubular stanchion. At least one substantially cylindrical sleeve is rotatably mounted about the support stanchion. The cylindrical sleeve is provided with a radial bore therethrough, which is positioned at substantially the same axial distance along the stanchion as the radial holes in the stanchion. A horizontal storage shelf is offset mounted to the cylindrical sleeve, and has at least one drawer moveably mounted to the underside thereof for selective movement between a closed position beneath the shelf and an open position wherein the drawer extends outwardly from the shelf. A plunger is provided which has a pin end sized to pass through the radial hole in the sleeve and the radial holes in the stanchion. The plunger is mounted to the storage shelf so that the pin end is in axial alignment with the bore through the sleeve. Spring means are proVided for biasing the plunger towards the sleeve so that the pin passes through the radial bore through the sleeve and a radial hole in the stanchion when the shelf is rotated to either the first or second angular position, thereby locking the shelf in the selected angular position. Operator actuated handle means are provided for withdrawing the plunger pin from the radial hole in the stanchion, so as to selectively unlock the shelf to be rotated between the first and second selected angular positions.

Means may also be provided for mounting the stanchion to a vertical sidewall of a pickup box. The means for mounting the stanchion to the sidewall of the pickup box may comprise a substantially vertical support plate anchorable to the sidewall, at least one vertical pin mounted to the support plate and having an upwardly extending end, and a substantially horizontal plate mounted to the stanchion, the horizontal plate having a laterally extending portion with a substantially vertical hole therethrough for receiving the upwardly extending end of the vertical pin when the plate is lowered thereon.

The storage unit may further comprise a plurality of such sleeves mounted sequentially along the stanchion, each sleeve having a storage shelf and a locking means mounted thereon. Bearing means, such as a Teflon washer, may be mounted about the stanchion and against the upper and lower ends of each of the sleeves for reducing friction resulting from rotation of the rotatable sleeves.

Each storage shelf may comprise a rectangular base panel having an upstanding rim mounted about the edges thereof for retaining material on the storage shelf. Each rectangular storage shelf may have a sleeve mounted at a corner of the rectangular base panel. A first drawer may be mounted to the underside of the storage shelf so that, in an open position, the first drawer extends outwardly from a first edge of the rectangular base panel, and a second drawer may be mounted to the underside of the storage shelf so that, in an open position, the second drawer extends outwardly from an opposite edge of the rectangular base panel, the opposite edge being substantially parallel to the first edge. The first edge and opposite edge of the base panel may preferably be disposed substantially parallel to the pickup box sidewalls when the storage shelf is in the second selected angular position, so that the first and second drawers are accessible to an operator located outside of the pickup box when the shelf is in the second angular position. The first and second selected angular positions may be separated from one another by an angular distance of about 90 degrees.

An adjustable collar may be provided for adjusting the height of each storage shelf. The adjustable collar may comprise a substantially cylindrical collar moveably mounted about the exterior of the stanchion. The collar has a substantially horizontal upper face for abutment against a lower face of a rotatable sleeve having a shelf mounted thereon. The collar has at least two radial holes in the exterior thereof for receiving the pin end of the plunger mounted on the shelf. The holes on the collar are spaced apart from one another by a selected angular distance. The collar also has at least one radial threaded bore therethrough, the threaded bore having a set screw in threadable engagement therewith for bearing against the stanchion, so as to secure the collar at a selected height.

These and other features of the present invention will become apparent from the following detailed description.

DESCRIPTION OF THE PREFERRED EMBODIMENTS

Figure 1:
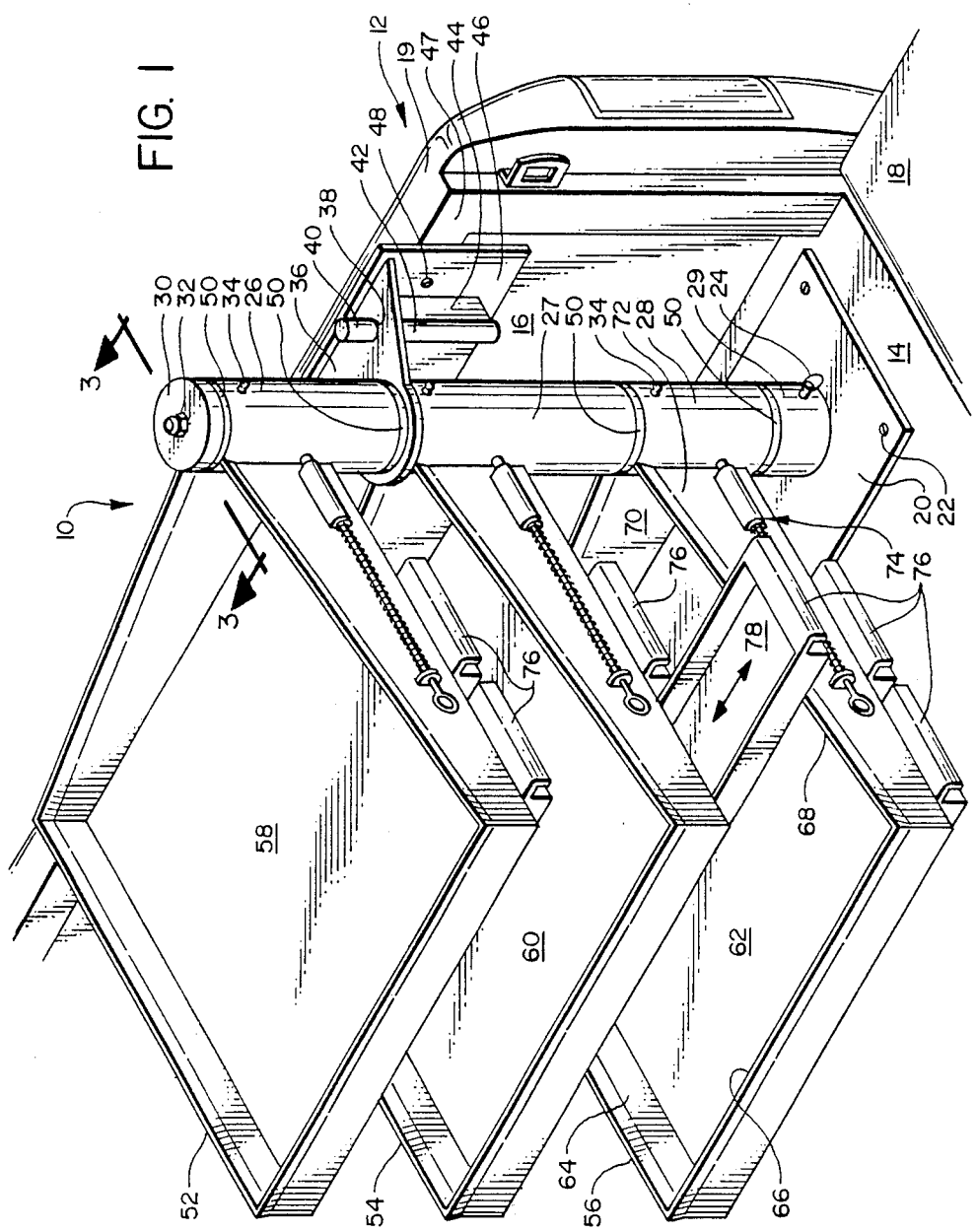
FIG. 1 is a perspective view of a vehicle storage unit incorporating the present invention.

With reference to FIG. 1, there is shown a storage unit 10 in accordance with the present invention. Storage unit 10 is seen mounted in a rear corner of a conventional pickup truck box 12. Pickup box 12 comprises a generally horizontal bed 14 which is bounded on its longitudinal sides by a pair of generally vertical sidewalls 16 (one shown in FIG. 1). In a conventional manner, pickup box 12 is closed at its rearward end by tailgate 18. When tailgate 18 is lowered, a lateral opening is formed at the rearward end of pickup box 12, so as to provide access to the interior thereof. Sidewalls 16 of pickup box 12 are provided with substantially horizontal top surfaces 18, which, in a conventional manner, provide a convenient mounting surface for attachment of a conventional pickup canopy for protection of the contents of pickup box 12.

With further reference to FIG. 1, the storage unit of the present invention will now be described. Storage unit 10 comprises a base plate 20 which is suitable for anchoring to pickup box bed 14. In the preferred embodiment illustrated in FIG. 1, base plate 20 is a substantially rectangular piece of heavy gauge metal, such as aluminum, which has a flat underside surface which abuts pickup bed 14. Base plate 20 is anchored to pickup bed 14 by any suitable means, which in FIG. 1 is a plurality of bolts 22 which pass through base plate 20 and pickup box bed 14. Bolts 22 may preferably be secured by nuts (not shown) threaded on the ends of bolts 22 which protrude underneath bed 14. For enhanced stability, a bolt 22 may be installed at each corner of rectangular base plate 20. As will be described below, an upright support stanchion (not shown in FIG. 1) is secured to base plate 20. A toggle pin 24 may preferably be provided to secure the stanchion to base plate 22. Mounted about the upright stanchion are a series of substantially cylindrical sleeves 26, 27, and 28. Cylindrical sleeves 26, 27, and 28 are most preferably constructed of relatively heavy gauge aluminum pipe. However, it will be understood that a wide variety of suitable materials may be used for the cylindrical sleeves, including, for example, steel, plastic, or fiberglass pipe, as well as any other suitable tubular material. Cylindrical sleeves 26, 27 and 28 are mounted or stacked about the upright stanchion, one above another, and are rotatable about the stanchion independently of one another. In other words, cylindrical sleeve 26 may be rotated while cylindrical sleeve 27 remains stationary, cylindrical sleeve 27 may be rotated while cylindrical sleeve 28 remains stationary, and so forth. A non-rotating spacer sleeve 29 is provided at the lower end of the stack of rotatably mounted sleeves, so as to provide adequate clearance between pickup bed 14 and the storage shelf mounted to the lowermost rotatable sleeve (sleeve 30 in FIG. 1). Spacer sleeve 29 is provided with a substantially horizontal bore through which toggle pin 24 passes.

At the upper end of the stack of rotatably mounted sleeves is preferably provided a cap 34, which both helps maintain the rotatably mounted sleeves in position along the support stanchion, especially when the storage unit is subjected to jarring and vertical motions as the pickup truck is driven over rough roads, and prevents the accumulation of dust and debris between the stanchion and the top sleeve. Cap 30 is secured in place by locknut 32, as will be described in greater detail below.

Each rotatably mounted sleeve is preferably provided with a grease nipple 34. Grease nipples 34 permit the injection of lubricating grease into the annular space between the sleeves and the support stanchion, so as to enhance the smooth operation and service life of storage unit 10. Grease nipples 34 are preferably mounted near the upper ends of the sleeves, so that the injected grease will migrate downwardly therefrom under the influence of gravity, thereby effectively filling the annular space. Additional lubrication fittings may be provided on storage unit 10 as needed or desired.

Mounted intermediate cylindrical sleeves 26 and 27, and about the internal support stanchion, is lateral support plate 36. Lateral support plate 36 is preferably provided for mounting to sidewall 16 of pickup box 12, as will be described in greater detail below, so as to provide lateral support to the upper end of the storage unit; however, it will be understood that this arrangement illustrates a preferred embodiment of a present invention, and may, in some embodiments, be found to be unnecessary if the support provided at the base of the unit is sufficient to provide adequate rigidity along the entire vertical length of the storage unit. Lateral support plate 36 is provided with a pair of holes 38 (one shown in FIG. 1) through which upper ends 40 of substantially vertical pins 42 protrude, when the storage unit 10 is installed, as will be described in greater detail below. Substantially vertical mounting pins 42 are attached to an extension bracket 44, preferably by welding, which in turn is attached to substantially vertical side mount plate 46, also preferably by welding. Lateral support plate 36, mounting pins 42, extension bracket 44, and side mount plate 46, may most preferably be constructed out of aluminum. However, it will be understood that a wide variety of other suitable materials may be utilized, including, for example, steel, fiberglass, or high strength plastic. Side mounting plate 46 is preferably mounted to sidewall 16 of pickup box 12 by means of bolts 48 (one shown in FIG. 1). It will be noted that side mount plate 46 is preferably mounted against a vertical interior edge 47 of sidewall 16, so as to leave horizontal upper edge 18 of pickup box 12 clear for proper installation of a conventional canopy.

As noted above, each of the substantially cylindrical sleeves 26, 27, and 28, are mounted so as to be rotatable independently of one another. Bearing rings 50 are preferably mounted between each rotatably mounted sleeve and each adjoining sleeve, or nonrotating part, which abuts the sleeve. Accordingly, with reference to FIG. 1, it will be seen that a first bearing ring 50 is mounted intermediate cap 30 and sleeve 26, a second bearing ring 50 is mounted intermediate sleeve 26 and lateral support bracket 36, a third bearing ring (not shown) is mounted intermediate lateral support bracket 36 and rotatable sleeve 27, a fourth bearing ring is mounted intermediate sleeve 27 and sleeve 28, and a fifth bearing ring is mounted intermediate rotatable sleeve 28 and base extension sleeve 29. Bearing rings 50 serve to reduce the friction between rotating and nonrotating elements of the storage unit. Most preferable, bearing rings 50 comprise large Teflon washers, which have been found to be durable and which provide a smooth bearing action.

Mounted to each pivotably mounted sleeve 26, 27, and 28, is a storage shelf. In the storage unit illustrated in FIG. 1, there are three storage shelves: storage shelf 52 is mounted to sleeve 26, storage shelf 54 is mounted to sleeve 27, and storage shelf 56 is mounted to sleeve 28. It will be understood, of course, that any desired number of shelves and sleeves may be similarly installed. Each storage shelf preferably comprises a substantially rectangular base panel 58, 60, and 62. Base panels 58, 60, and 62 serve to support tools and materials which may be stored in storage shelves 52, 54, and 56 respectively. Each base panel is consequently preferably strong enough to support heavy tools and materials, and may most preferably be constructed of sturdy sheet aluminum. About the edges of each rectangular base plate are mounted upright retaining walls for retaining tools and materials within the storage shelves. For example, about the edges of rectangular base panel 62 are mounted retaining walls 64, 66, 68 and 70. The retaining walls may preferably be constructed of sturdy sheet aluminum, and may preferably be welded to or bent from the rectangular base panels. It will be noted that, inasmuch as base panel 62 is a substantially rectangular panel, pairs of walls 66–70 and 64–68 each comprise walls which are substantially parallel to one another.

Each rotatable sleeve is mounted to its storage shelf so that the geometric center of the storage shelf is offset from the vertical axis of the sleeve, i.e. the center of the storage area provided by the shelf is off-centered from the sleeve. Preferably, in the embodiment illustrated in FIG. 1, each rotatable sleeve is mounted to a corner of the rectangular base panel of the storage shelf. For example, it will be seen that rectangular base panel 62 has rotatable sleeve 28 mounted to a corner thereof. Retaining walls 68 and 70 along the edges of base panel 62 are also mounted to sleeve 28. Retaining walls 68 and 70, as well as base panel 62, may preferably be mounted to rotatable sleeve 28 by welding; it may be desirable in some embodiments, however, for storage shelf 56 to be detachably mounted to sleeve 28 so as to facilitate removal and replacement of damaged storage shelves, or interchangeability of different sizes of storage shelves. For example, retaining walls 68 and 70 of storage shelf 56 might be bolted to extensions welded to rotatable sleeve 28. The retaining walls which are mounted to the sleeve (e.g., retaining walls 68 and 70) each preferable have a wide base edge 72 mounted to the sleeve so as to provide the storage shelf 56 with adequate support against downwardly bending forces exerted by heavy loads retained within the storage shelf. Wide base edge 72 also provides a long contact joint for welding, so as to permit formation of a very strong welded connection. The retaining walls mounted to the rotatable sleeve may taper outwardly from the wide base edge, so as to facilitate easier access to the areas of the storage shelf which are further away from the rotatable sleeve, as well as to reduce excess weight.

Mounted to wall 68 of storage tray 56 is plunger assembly 74. As will be described in greater detail below with reference to FIGS. 3, 4, and 5, plunger assembly 74 serves to lock storage shelf 56 in first and second selected angular positions, and may be selectively unlocked so as to permit rotation of the shelf between the first and second selected angular positions. With reference to FIG. 1, it will also be noted that plunger assembly 74 is mounted so as to have its longitudinal axis substantially parallel to an edge of rectangular base panel 62, which, in turn, is substantially perpendicular to the rotatable sleeve to which the base panel is mounted; the axis of plunger assembly 74 is thus substantially perpendicular to the axis of the rotatable sleeve 28.

Mounted to the underside of each base panel 58, 60, and 62, are storage drawers 76. Storage drawers 76 are moveably mounted to the storage shelves so that they are selectively moveable between a closed position in which the storage area 78 of storage drawer 76 is beneath the rectangular base panel, and an open position wherein the drawer extends outwardly from beneath the shelf so that storage area 78 of storage drawers 76 is accessible to an operator. As shown in FIG. 1, groups of two or more storage drawers 76 may, if desired, be mounted side-by-side beneath each of the base panels. As will be discussed in greater detail below, storage drawers 76 are preferably mounted to each storage shelf so that at least one storage drawer 76 on each storage shelf can be reached and opened by an operator when the storage shelf is located in a first selected angular position such that the shelf is within the confines of the pickup truck box.

Figure 2:
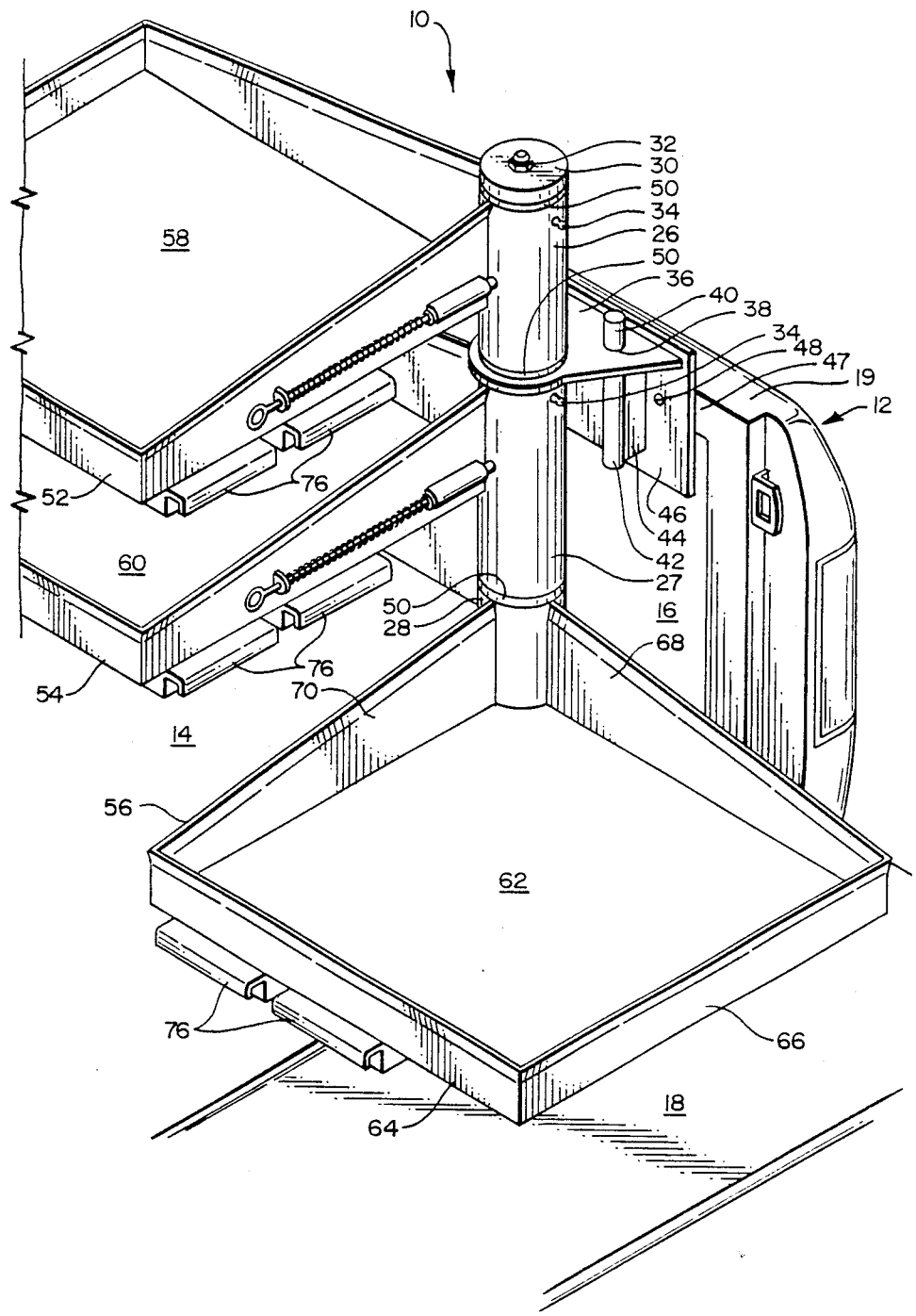
FIG. 2 is a perspective view of the storage unit of FIG. 1, wherein a storage shelf of the storage unit has been rotated to a selected position in which the storage shelf projects outwardly through the lateral opening at the rear end of the pickup box.

With reference now to FIG. 2, there is shown the storage unit of FIG. 1, wherein lowermost storage shelf 56 has been rotated from the first selected angular position shown in FIG. 1 to a second selected angular position in which tools or materials stored within storage shelf 56 are readily accessible by an operator. In the first position, shown in FIG. 1, wall 70 of storage shelf 56 was adjacent to and substantially parallel to sidewall 16 of pickup box 12, while wall 68 was substantially perpendicular to sidewall 16. In the second angular position, as shown in FIG. 2, retaining wall 70 is now substantially perpendicular to sidewall 16, while retaining wall 68 is now substantially adjacent to and parallel to sidewall 16. Accordingly, it will be seen that the first selected angular position and the second selected angular position are separated from one another by an angular distance of approximately 90 degrees. In the first angular position, the storage shelf is fully enclosed within pickup box 12 when tailgate 18 is closed, and is kept out of the way for the loading and unloading of other materials from within the pickup box. In the second selected angular position, base panel 62, and hence the storage area of storage shelf 56, extends outwardly through the lateral opening formed in the rearward end of pickup box 12 when tailgate 18 is lowered, so that the tools or materials stored therein are easily reached by a workman without having to crawl, reach, or bend an excessive distance into pickup box 12. Furthermore, inasmuch as each of the storage shelves 56, 54, and 52 is rotatable between such first and second selected angular positions independently of one another, a workman can readily access each storage area of a storage shelf, without having his access from above being blocked or otherwise interfered with by the remaining shelves. Also, as will be described in greater detail below, drawers 76 will be easily accessible by a workman at two sides of storage shelf 56 when it projects outwardly over the tailgate. It should also be noted that the foregoing operation and advantages of the storage unit are enhanced by mounting it in a rear corner of the pickup box, as shown in FIGS. 1 and 2.

Figure 3:
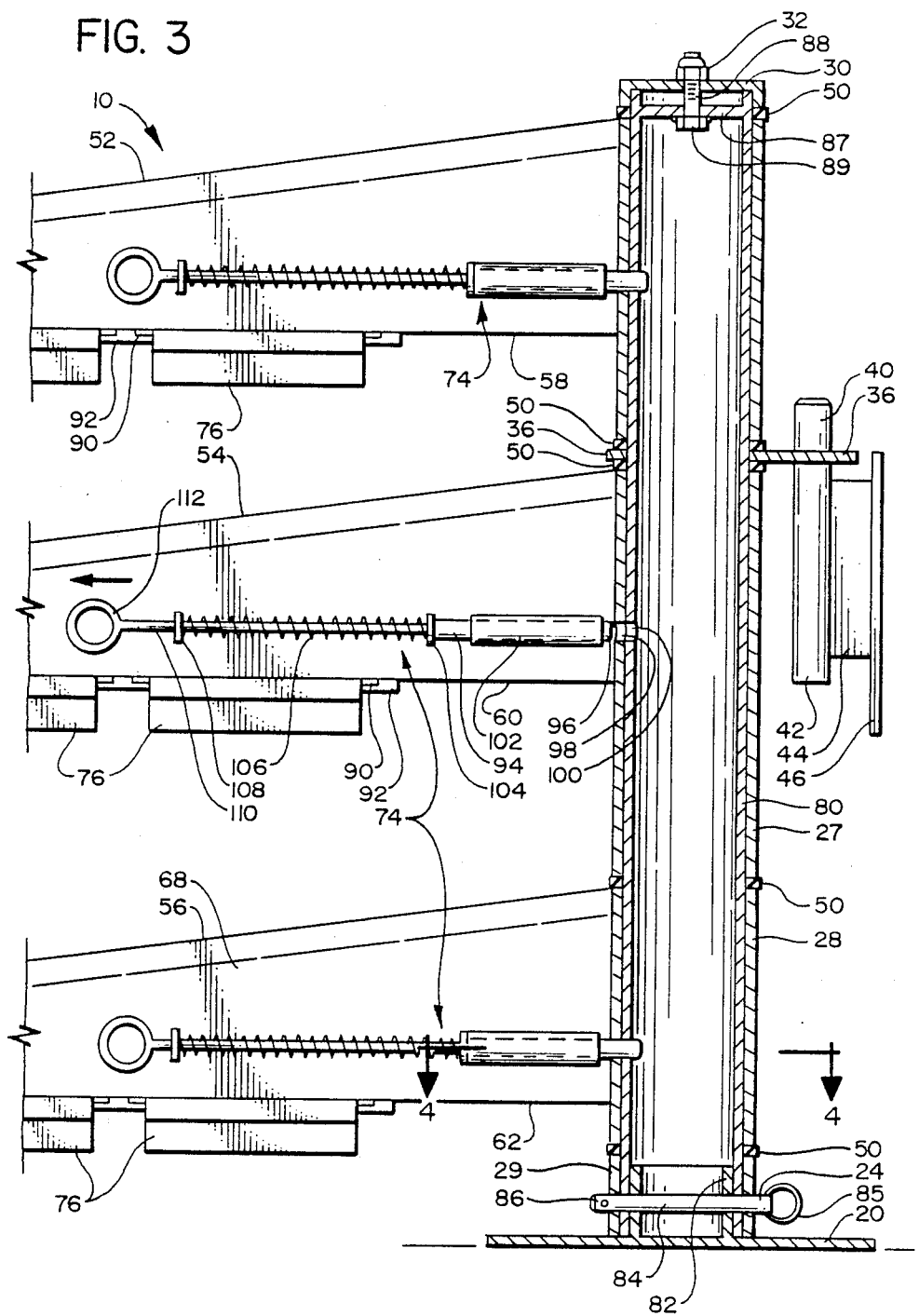
FIG. 3 is a longitudinal sectional view of the storage unit shown in FIG. 1, taken along line 3—3.

With reference now to FIG. 3, which is a sectional view taken along a longitudinal axis of the support stanchion and rotatable sleeves of the storage unit which was described above with reference to FIGS. 1 and 2, features of the present invention will be described in greater detail. With reference to FIG. 3, there is shown vertical support stanchion 80. Support stanchion 80 is preferably substantially cylindrical, and is sized to fit closely within cylindrical sleeves 26, 27, and 28, so that the sleeves are free to rotate about support stanchion 80 when mounted thereon. Support stanchion 80 may most preferably be a length of sturdy aluminum tubing or pipe; however, support stanchion 80 may be fabricated of any suitable substantially rigid tubular material, such as, for example, plastic or steel pipe. Furthermore, it may be desirable for support stanchion 80 to be fabricated of a material having different wear characteristics than the material of which the rotatable sleeves are fabricated: for example, if the storage shelves are permanently attached to the rotatable sleeves, it may be desirable to fabricate the support stanchion of a slightly softer material than the rotatable sleeves which bear against it, so that the relatively inexpensive support stanchion may be replaced when worn, without the need for replacement of the storage shelves. Conversely, if the storage shelves are detachably mounted to the rotatable sleeves, it may be desirable to fabricate the relatively inexpensive rotatable sleeves of a material which is slightly softer than the material of which the support stanchion is fabricated.

Support stanchion 80 is preferably mounted to base plate 20 by fitting support stanchion 80 over lug 82. Lug 82, which is preferably a short length of pipe sized to fit closely within the internal diameter of support stanchion 80, is welded or otherwise attached to base plate 20 so that lug 82 has an axis which is substantially perpendicular to the plane of base plate 20. In other words, when base plate 20 is anchored to a substantially horizontal pickup truck bed, lug 82 will extend in a substantially vertical direction from base plate 20. As noted above, a conventional toggle pin 24 is preferably provided for securing support stanchion 80 to base plate 20; a continuous, substantially horizontal bore is provided through spacer sleeve 29, support stanchion 80, and lug 82, through which shaft 84 of toggle pin 24 passes. Toggle pin 24 has a pull ring 85 on one end thereof for easy insertion and removal by an operator, and a protruding end 86 which protrudes outwardly from spacer sleeve 32 opposite pull ring 85. Accordingly, it will be understood that the mounting arrangement shown in FIG. 3 renders the storage unit of the present invention very quick and easy to remove and then reinstall as desired: if the workman desires to remove the storage unit so that he can use the full capacity of the pickup box for carrying cargo, he simply pulls toggle pin 24 out of base lug 82 and lifts storage unit 10 vertically to disengage it from the pickup box; the lower end of stanchion 80 will slide vertically off of base lug 82, and lateral support bracket 36 will slide vertical off of vertically protruding ends 40 of pins 42. To reinstall the storage unit, the process is simply reversed. As noted above, toggle pin 24 is a conventional toggle pin; many other conventional means for suitably securing stanchion 80 to base plate 20 are known to those skilled in the art; for example, any number of cotter keys, bolts, and the like, may be substituted for toggle pin 24.

At the upper end of support stanchion 80 is an end plate 87, which is preferably welded to the inside of stanchion 80. End plate 87 has a central bore through which bolt 88 passes. Bolt 88 serves to secure cap 30 to the top of support stanchion 80, and has a head 89 which bears against the underside of end plate 87. Bolt head 89 is preferably tack-welded to end plate 87 so as to ease assembly by preventing bolt 88 from turning while nut 32 is installed on the other end thereof. Nut 32, which is preferably a lock nut, such as a nyloc nut, bears against the top of cap 32 so as to hold cap 32 securely in place on the top of the support stanchion and sleeves.

With further reference to FIG. 3, it will be seen that drawers 76 are mounted to the undersides of base panels 58, 60, and 62. Drawers 76 have runners 90 which extend horizontally from the longitudinal edges of drawers 76. Runners 90 are retained in, and rest on, guides 92, which are provided with longitudinal notches within which runners 90 are retained. Guides 92 are preferably constructed of a material having suitable bearing characteristics to permit the easy movement of drawers 76 between the closed and opened positions. For example, guides 92 may be fabricated of a suitable plastic or Teflon material. This is an inexpensive and effective arrangement, however, any suitable drawer mounting means may, of course, be substituted for the runners and guides shown in FIG. 3, if desired.

With further reference to FIG. 3, the plunger assembly briefly addressed above will be described in greater detail. With reference to FIG. 3, it will be seen that plunger assembly 74 comprises a plunger 94 having a pin 96 on a first end thereof. Pin 96 is sized to pass through a first horizontal bore 98. First horizontal bore 98 is provided in sleeve 27 so that pin end 26 is fixed in alignment therewith. Second horizontal bore 100 is provided through support stanchion 80, and is also sized so as to permit the passage of pin end 96 therethrough. It should be noted at this point that, while it is preferable that bore 100 completely penetrate the wall of support stanchion 80 so as to provide strong, positive locking action when pin 96 passes therethrough, a similarly sized recess or other hole in the surface of support stanchion 80 might also be used. Second horizontal bore 100 is provided in support stanchion 80 an axial distance along stanchion 80 such that the axis of second bore 100 will be substantially coplanar with the axis of first bore 98 when rotatable sleeve 28 is mounted on support stanchion 80. Accordingly, when storage shelf 54 is rotated to a selected angular position, first and second horizontal bores 98 and 100 will be in alignment so as to permit passage of pin end 96 therethrough.

Plunger assembly 74 further comprises a pin guide 102 which is mounted to the side of storage shelf 54. Pin guide 102 has an internal bore selected to permit pin end 96 to reciprocate therethrough, and has an axis aligned to direct pin end 96 through first horizontal bore 98. Plunger stop 104 is mounted to the second end of plunger 94, which is opposite pin end 96, so as to provide a stop which prevents axial movement of pin end 96 into horizontal bores 98 and 100 past a desired point, by reacting against pin guide 102. Pin stop 104 also bears, on its side opposite pin guide 102, against a first end of spring 106. The other end of spring 106 bears against spring stop 108. Spring stop 108 is fixed to the side of storage shelf 54, and has a horizontal bore for the passage therethrough of plunger rod 110. Plunger rod 110 is mounted to plunger head 104, extends horizontally from plunger head 104 through spring 106 and spring stop 108, and terminates in pull ring 112. Inasmuch as spring 106 is mounted intermediate plunger head 104 and spring stop 108 about plunger rod 110, spring 106 biases plunger 94 towards sleeve 27 and support stanchion 80, thus tending to force pin end 96 through bores 98 and 100 when they are aligned, thereby locking rotatable sleeve 28 and storage shelf 54 in a selected angular position. Pull ring 112 provides a convenient grasping point for an operator, so that an operator may pull on plunger rod 110, so as to cause spring 106 to yield, withdrawing pin end 96 from bores 98 and 100, and thereby selectively unlocking rotatable sleeve 27 and storage shelf 54 for rotation to a second selected angular position.

The components of plunger assembly 74 may preferably be fabricated of stainless steel, so as to be endowed with high strength good wear characteristics, and good corrosion resistance, which will enhance the service life of the assembly. Furthermore, plunger assembly 74 may, if desired, be fabricated as a complete, separate unit, which may then be welded or otherwise attached in position to the wall of the storage tray, so as to facilitate ease of assembly. For example, plunger assembly 74 may be built up on a single piece of stainless steel flat bar, with a stainless steel pin guide 102 mounted on one end, and the other end bent up and perforated to form spring stop 108, which piece of flat bar, together with the components mounted thereto, can be attached as a unit to the side wall of the storage tray.

It should be noted at this point that, while, for the sake of simplicity, the description provided herein of a given element, such as a plunger assembly, drawer, storage shelf, or rotatable sleeve, may address a single such element, such description will be understood to apply to each such element where a plurality of such elements are incorporated in a storage unit of the present invention. For example, the preceding discussion has provided a description of a single plunger assembly 74 mounted to storage shelf 54; it will be understood that plunger assembly 74 mounted to storaqe shelf 52, plunger assembly 74 mounted to storage shelf 56, and so forth, are substantially identical in construction and operation to the single plunger assembly which has been described in detail.

Figure 4:
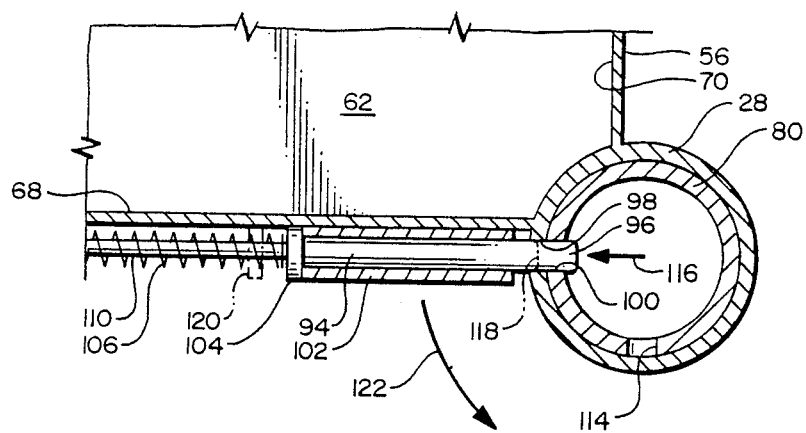
FIG. 4 is a partial sectional view of a storage unit shown in FIG. 3, taken along line 4—4, wherein the lower storage shelf of the unit is in a first selected angular position.
Figure 5:
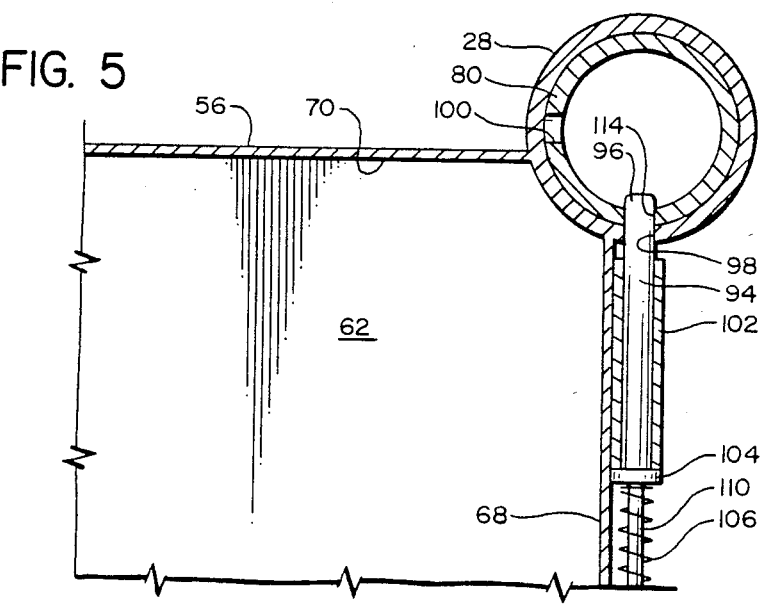
FIG. 5 is a partial sectional view of the storage unit shown in FIG. 4, in which the lower upper storage shelf of the unit has been rotated to a second selected angular position.

With reference now to FIGS. 4 and 5, the unlocking of a storage shelf at a first selected angular position, rotation of the storage shelf to a second selected angular position, and locking of the storage shelf at the second selected angular position will be described. FIGS. 4 and 5 are cross-sectional views of a portion of storage shelf 56, rotatable sleeve 30, and support stanchion 80, taken along line 4—4 shown in FIG. 3.

With reference to FIG. 4, it will be seen that storage shelf 56 is locked in a first selected angular position. The first selected angular position shown in FIG. 4 corresponds to the angular position of storage shelf 56 which is shown in FIG. 1, i.e., storage shelf 56 is locked in an angular position such that storage shelf 56 is within the confines of the pickup box (so that the tailgate can be closed), with retainer wall 70 preferably adjacent to and substantially parallel to the sidewall of the pickup box, and with retainer wall 68 substantially perpendicular to the sidewall of the pickup box. So as to lock storage shelf 56 in the first selected angular position, pin 96 of plunger 94 passes through horizontal bore 98 in sleeve 28 and horizontal bore 100 in support stanchion 80 when the two bores are in alignment. As noted above, sleeve 28 is mounted about support stanchion 80 so that horizontal bores 98 and 100 have axes which are substantially coplanar, i.e., the axes of the bores are each located at substantially the same longitudinal distance from an end of the support stanchion. Consequently, storage shelf 56 need only be rotated about stanchion 80 and need not be moved longitudinally along stanchion 80, in order to bring horizontal bores 98 and 100 into alignment. A second horizontal bore 114 is also provided through support stanchion 80, and has an axis which is coplanar with those of horizontal bores 98 and 100. Horizontal bores 100 and 114 extend radially from the axis of support stanchion 80, and are separated from each other by a selected angular distance; most preferably, the selected angular distance by which the first horizontal bore 100 and second horizontal bore 114 are separated from one another is approximately equal to 90 degrees. When storage shelf 56 is locked in a selected position, spring 106 presses against plunger stop 104 so as to bias pin 96 on plunger 94 inwardly through horizontal bores 98 and 100. In order to unlock the storage shelf for rotation, the operator draws plunger rod 110 outwardly from support stanchion 80 and rotatable sleeve 28 (to the left in FIG. 4), overcoming the force of spring 106. Pin 96 is, consequently, withdrawn from horizontal bore 100 to a position, as indicated by dotted lines 118, in which pin 96 is no longer in contact with support stanchion 80; similarly, plunger stop 104 is drawn away from guide 102, to a position which is indicated by dotted lines 120. Inasmuch as the pin 96 is no longer in engagement with nonrotating support stanchion 80, storage shelf 56 is free to be pivoted or rotated in the direction indicated by arrow 122, to a second selected angular position.

With reference now to FIG. 5, the portion of the storage unit which was shown in FIG. 4 is now shown with storage shelf 56 rotated to and locked in a second selected angular position. With reference to FIG. 5, it will be seen that storage shelf 56 has been rotated to a point where horizontal bore 98 in rotatable sleeve 28 is in alignment with second horizontal bore 114 in support stanchion 80. When horizontal bores 98 and 114 reach alignment, plunger 94, having been released by the operator following the unlocking step described above, will be biased inwardly towards support stanchion 80 by spring 106, so that pin 96 is driven through horizontal bores 98 and 114. When pin 96 enters horizontal bore 114, it engages non-rotating support stanchion 80, thereby locking storage shelf 56 in the second selected angular position. The edges of bores 114 and 100 may be chamfered at the exterior surface of support stanchion 80, so as to facilitate ease of alignment and engagement of the bores by pin 96.

Figure 6:
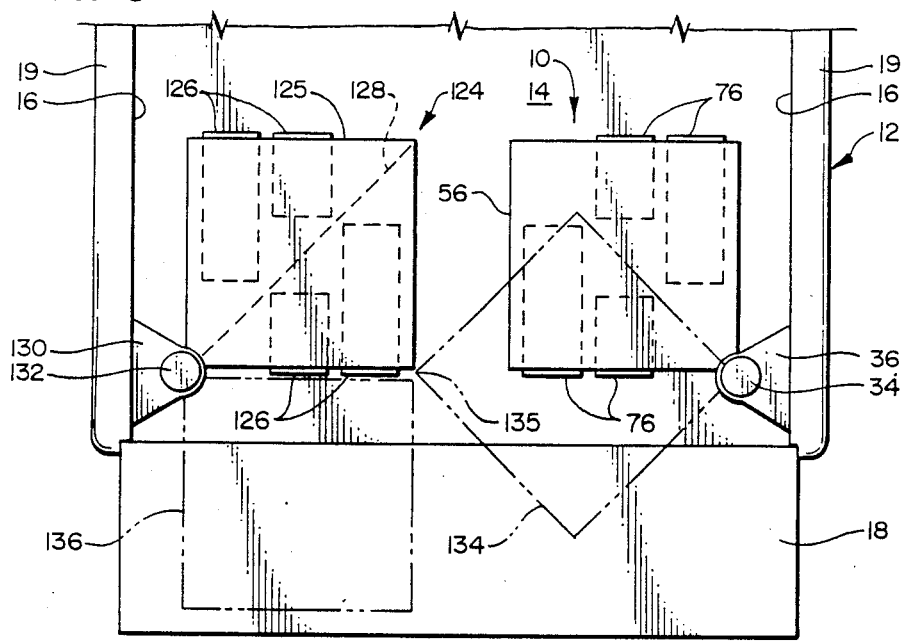
FIG. 6 is an overhead elevational view of a pair of storage units incorporating the present invention, mounted against opposite sides of a pickup box.

With reference now to FIG. 6, there is seen a pair of storage units in accordance with the present invention mounted in conventional pickup box 12. First storage unit 10 is shown mounted to bed 14 in a rearward corner of pickup box 12, in the manner described above. A lateral opening is formed across the rearward end of pickup box 12 by the lowering of tailgate 18. Storage unit 10 is provided with two sets of storage drawers 76; for purposes which will be described in greater detail below, the first set of drawers is mounted so as to open by extending outwardly from the edge of storaqe shelf 56 which faces the tailgate opening when the storage shelf is locked in the enclosed angular position, and the second set of drawers is mounted so as to open by extending outwardly from the opposite edge of storage shelf 56.

With further reference to FIG. 6, it will be seen that second storaqe unit 124 is mounted in the other rearward corner of pickup box 12, adjacent to a second sidewall 16. Second sidewall 16 is opposite and parallel to the first sidewall 16, next to which the first storage unit 10 is mounted. Storage unit 124 is substantially identical in construction to storage unit 10. In substantially the same manner as was described above, storage unit 124 is mounted to bed 14, and has a lateral support plate 130 which is mounted to sidewall 16. Furthermore, storage unit 124 is provided with a support stanchion and series of sleeves rotatably mounted about the support stanchion, topped by a cap 132.

Storage unit 124 is provided with at least one rectangular storage shelf 125. Pairs of storage drawers 126 are mounted to storage shelf 125 so as to open by extending outwardly from opposite edges thereof, with such edges preferably being arranged so as to be perpendicular to sidewalls 16 when storaqe shelf 125 is in the first, enclosed angular position, and parallel to the sidewalls when storage shelf 125 is in the second, extended position; thus, the workman can stand by tailgate 18 and easily reach either set of drawers when the shelf is in the extended position. It will also be noted that the arrangement of pairs of storage drawers 126 facing outwardly from opposite edges of storage shelf 125 increases the amount of storage space provided by storage unit 124, in those versions of the storage unit which have a diagonal support bracket installed across the underside of storage shelf 125, as indicated by broken line 128; when such a diagonal support bracket is installed, it is not possible for a single storage drawer to extend the full width of storage shelf 125 because it is blocked from doing so by the support bracket. If a diagonal support bracket is not provided, however, it may be desirable to fabricate the individual storage drawers so that they extend across the full width of the storage shelf.

With further reference to FIG. 6, it will be seen that storage units 10 and 124 are installed in pickup box 12 with sufficient lateral clearance between them so as to avoid impact by a selected shelf of one storage unit against the other storage unit when the selected shelf is rotated between the first and second selected angular positions. Thus, it will be seen that when storage shelf 56 is unlocked and pivoted, as indicated by broken line image 134, the corner 135 of shelf 56 which extends furthest outwardly from the support stanchion does not impact storage shelf 125 of storage unit 124. Furthermore, it will be seen that when storage shelf 125 of storage unit 124 is rotated to the second selected angular position, so that it extends through the lateral opening at the rear end of the pickup box and over tailgate 18 as indicated by broken line image 136, the storage areas provided by storage shelf 125 are readily accessible by an operator without having to lean or reach excessively into pickup box 12.

Figure 7:
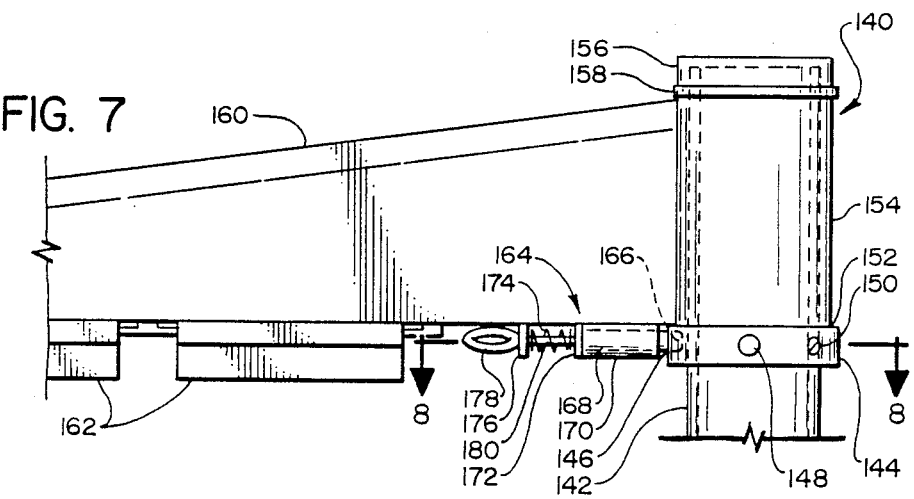
FIG. 7 is a side elevational view of an upper shelf of another embodiment of a storage unit incorporating the present invention, wherein the height of the shelf is selectively adjustable.

With reference now to FIG. 7, there is shown a portion of another storage unit which incorporates the present invention, in which the height of the storage shelf is adjustable. Storage unit 140 is provided with a substantially vertical tubular support stanchion 142, in a manner similar to that which was described above with reference to support stanchion 80 shown in FIGS. 3 through 5. It will be noted, however, that support stanchion 142 is substantially free of horizontal bores or other holes in the wall thereof for locking the storage shelves in selected angular positions. Instead, such holes are provided in an adjustable support collar 144, which is mounted about support stanchion 142. Support collar 144, which may be fabricated from aluminum, steel, plastic, or other suitable materials, is preferably formed as a short, thick-walled cylinder having an internal bore sized to fit closely over the exterior of support stanchion 142. Support collar 144 is provided with horizontal radial bores 146 and 148, which have coplanar axes, and which are separated from one another by a selected angular distance, much in the manner as described above with reference to the bores which penetrate support stanchion 80, as shown in FIGS. 4 and 5. A pair of set screws 150 (one shown in FIG. 7) are provided to secure support collar 144 to support stanchion 142. Support collar 144 has a smooth upper surface 152 which bears against a lower edge of sleeve 154, which is rotatably mounted about support stanchion 142 in a manner similar to that described above. If desired, a bearing ring, such as a Teflon washer, may be installed intermediate the lower edge of rotatably mounted sleeve 154 and upper surface 152 of support collar 144. The upper end of support stanchion 142 may be provided with a cap 156, and a bearing ring 158 may be mounted intermediate cap 156 and rotatably mounted sleeve 154.

A storage shelf 160 is mounted to rotatable sleeve 154, and has storage drawers 162 mounted to the underside thereof. A plunger assembly 164 is also mounted to storage shelf 160, so that pin 166 on plunger 168 may be rotated into alignment with horizontal bores 146 and 148 in support collar 144. As was described above, plunger assembly 164 is also provided with a plunger guide 170 which is mounted to storage tray 160, and against which plunger head 172 bears. A spring 174 is mounted intermediate plunger head 172 and spring stop 176, which is mounted to storage shelf 160. Spring 174 acts against plunger head 172 so as to bias pin 166 into bores 146 and 148 when pin 166 is rotated into alignment with either of them thereby locking storage tray 160 in either a first or a second selected angular position. A pull ring 178 is provided on the end of plunger rod 180 so that an operator can pull on the plunger rod, overcoming the force of spring 174 and withdrawing pin 176 from horizontal bore 146 or 148 in support collar 144, thereby unlocking storage shelf 160 to be rotated to either of the selected angular positions.

Figure 8:
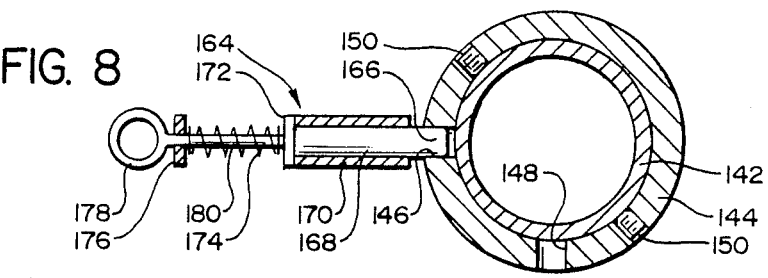
FIG. 8 is a sectional view of the storage unit shown in FIG. 7, taken along line 8—8.

With reference now to FIG. 8, there is shown a cross-sectional view of the storage unit shown in FIG. 7, taken along line 8—8 shown in FIG. 7. Support stanchion 142 is shown having support collar 144 mounted thereon. It will be observed that pin 166 of plunger assembly 164 is biased inwardly into bore 146 of support collar 144 by spring 174, so that pin 166 engages support collar 144, thereby locking the storage shelf in a selected angular position. As described above, pin 166 may be withdrawn from bore 146 by an operator so as to selectively unlock the storage shelf, which may then be rotated to and locked in a second selected angular position where pin 166 penetrates bore 148 in support collar 144. It will also be noted that support collar 144 is provided with a pair of set screws 150, which are in threadable engagement with threaded horizontal bores in support collar 144. Set screws 150 have inner ends which bear against the exterior of support stanchion 142, so as to grip support stanchion 142 and secure support collar 144 in position on support stanchion 142. Thus secured, support collar 144 is able to bear the weight of storage shelf 160, along with that of the tools and material stored therein. If desired, however, the height of storage shelf 160 may be adjusted in the embodiment of the invention shown in FIGS. 7 and 8, by loosening set screws 150 out of engagement with the exterior surface of support stanchion 142, and raising or lowering support collar 144 as desired. Once support collar 144 has been adjusted, set screws 150 can be tightened again so as to secure support collar 144 to support stanchion 142 in the new position, at which new position support collar 144 can support storage shelf 160 at the desired new height.

It is to be recognized that various modifications could be made to these illustrative embodiments without departing from the spirit and scope of the present invention. Accordingly, the invention is not to be limited except as by the appended claims.

What is claimed and desired to be secured by Letters patent of the United States is:

1. A storage unit for mounting in the box of a pickup truck, said pickup box having a substantially horizontal bed, a pair of substantially vertical longitudinal sidewalls, and a lateral rear opening, said storage unit comprising, a base anchorable to said pickup bed;
   a substantially vertical support stanchion mounted to said base;
   a first storage shelf pivotably mounted to said support stanchion;
   means for locking said first storage shelf in first and second selected angular positions about said support stanchion
   a second storage shelf pivotably mounted to said support stanchion so that said second storage shelf and said first storage shelf are pivotable about said stanchion independently of one another; and
   means for locking said second storage shelf in first and second selected angular positions about said support stanchion
   wherein said first selected angular position is such that said storage tray is adapted to be located within said pickup box intermediate said sidewalls, and said second selected angular position is such that said storage tray is adapted to extend outwardly through said lateral rear opening of said pickup box.

2. The storage unit of claim 1, wherein said support stanchion has a substantially cylindrical exterior, and wherein each said storage shelf comprises,
   a substantially cylindrical sleeve mounted around said support stanchion; and
   a substantially horizontal storage tray mounted to said sleeve.

3. The storage unit of claim 2, wherein each said storage tray is substantially rectangular in horizontal cross-section, and wherein said cylindrical sleeve is mounted to a corner of said rectangular tray.

4. A storage unit for mounting in the box of a pickup truck, said pickup box having a substantially horizontal bed, a pair of substantially vertical longitudinal sidewalls, and a lateral rear opening, said storaqe unit comprising:

a base supporting plate anchorable to said pickup box bed;
   a substantially cylindrical support stanchion, said stanchion having at least one set of first and second radial holes in the exterior surface thereof, said first and second holes each being located at substantially the same axial distance along said stanchion and being spaced apart from one another by a selected angular distance;
   means for mounting said support stanchion to said base supporting plate in substantially vertical orientation to said pickup bed;
   at least one substantially cylindrical sleeve rotatably mounted about said vertical support stanchion, said cylindrical sleeve having a radial bore therethrough, said bore in said sleeve being positioned at substantially the same axial distance along said stanchion as said set of holes in said stanchion:
   a substantially horizontal storage shelf having a storage area, said storage shelf being mounted to said cylindrical sleeve so that said storage area is off-centered from said sleeve;
   at least one drawer moveably mounted to the underside of said storage shelf for selective movement between a closed position beneath said shelf and an open position wherein said drawer extends outwardly from beneath said shelf;
   a plunger having a pin end sized to pass through said radial bore in said sleeve and said radial holes in said stanchion, said plunger being mounted to said shelf so that said pin is in axial alignment with said bore in said sleeve;
   spring means for biasing said plunger inwardly towards said stanchion so that said pin passes through said radial bore in said sleeve and a said radial hole in said stanchion when said shelf is rotated to first and second selected angular positions, so as to lock said shelf in each said selected angular position; and operator actuated handle means for withdrawing said plunger pin from each said radial hole in said stanchion so as to selectively unlock said shelf to be rotated from said first selected angular position to said second selected angular position.

5. The storage unit of claim 4, further comprising means for mounting said stanchion to a said vertical sidewall of said pickup box.

6. The storage unit of claim 5, wherein said stanchion is a substantially tubular stanchion, and wherein said means for mounting said stanchion in said vertical orientation to said pickup bed comprises a substantially cylindrical lug mounted cylindrically to said base supporting plate for being received within a lower end of said tubular stanchion when said stanchion is lowered onto said lug.

7. The storage unit of claim 6, wherein said means for mounting said stanchion to a said sidewall of said pickup box comprises:

a support plate anchorable to said sidewall;

at least one substantially vertical pin mounted to said support plate, said vertical pin having an upwardly extending end; and a substantially horizontal plate mounted to said stanchion, said horizontal plate having a laterally extending portion with at least one substantially vertical hole therethrough for receiving said upwardly extending end of said pin attached to said support plate when said horizontal plate is lowered onto said pin.

8. The storage unit of claim 4, further comprising a plurality of said sleeves mounted sequentially along said stanchion, each said sleeve having a said storage shelf and a said locking means mounted thereon.

9. The storage unit of claim 8, further comprising a bearing means mounted about said stanchion against upper and lower ends of each said sleeve.

10. The storage unit of claim 9, wherein each said bearing means is a Teflon washer.

11. The storage unit of claim 8, wherein each said storage shelf comprises a substantially rectangular base sheet having an upstanding rim at the edges thereof for retaining material on said storage shelf, and wherein each said storage shelf has a said sleeve mounted at a corner of said rectangular base sheet.

12. The storage unit of claim 11, wherein said first angular position is selected so that said storage shelf is adapted to be positioned within said pickup box intermediate said sidewalls, and said second angular position is selected so that said storage shelf is adapted to be positioned so as to extend outwardly from said pickup box through said lateral opening.

13. The storage unit of claim 12, wherein said at least one moveably mounted drawer comprises:

a first said drawer mounted to the underside of said storage shelf so that in said open position said first drawer extends outwardly from a first edge of said rectangular base sheet; and a second said drawer mounted to the underside of said storage shelf so that in said open position said second drawer extends outwardly from a second edge of said rectangular base sheet, said second edge being substantially opposite and parallel to said first edge.

14. The storage unit of claim 13, wherein said first and second edges of said base sheet are adapted to be positioned substantially parallel to said pickup box sidewalls when said storage shelf is locked in said second selected angular position, so that said first and second drawers are accessible to an operator located outside said pickup box when said shelf is in said second angular position.

15. The storage unit of claim 14, wherein said first selected angular position and said second selected angular position are separated from one another by an angular distance of about 90 degrees.

16. A storage unit for mounting in the box of a pickup truck, said pickup box having a substantially horizontal bed, a pair of substantially vertical longitudinal sidewalls, and a lateral rear opening, said storage unit comprising:

a base supporting plate anchorable to said pickup bed;

a substantially cylindrical support stanchion, said stanchion having at least one set of first and second radial holes in the exterior surface thereof, said first and second holes each being located at substantially the same axial distance along said stanchion and being spaced apart from one another by a selected angular distance;

means for mounting said support stanchion to said base supporting plate in substantially vertical orientation to said pickup bed;

at least one substantially cylindrical sleeve rotatably mounted about said vertical support stanchion;

a substantially horizontal storage shelf having a storage area, said storage shelf being mounted to said cylindrical sleeve so that said storage area is off-centered from said sleeve;

a substantially cylindrical collar moveably mounted about said stanchion, said collar having a substantially horizontal upper face for abutment against a substantially horizontal lower face of said sleeve, said collar having first and second radial holes in the exterior thereof, said holes on said collar being substantially coplanar and being spaced apart from one another by a selected angular distance, said collar further having at least one threaded radial bore therethrough;

at least one set screw in threadable engagement with said bore for bearing against said stanchion so as to secure said collar at a selected height;

a plunger having a pin end sized to pass through said radial bore in said sleeve and said radial holes in said collar, said plunger being mounted to said storage shelf so that said pin is in axial alignment with said bore in said sleeve;

spring means for biasing said plunger so that said pin passes through said radial bore in said sleeve and a radial hole in said collar when said shelf is rotated to a first and second selected angular positions, so as to lock said shelf in each said angular position;

operator actuated handle means for withdrawing said plunger pin from each said radial hole in said collar so as to selectively unlock said shelf to be rotated from said first selected angular position to said second selected angular position.

* * * * *